(12) United States Patent
Wang et al.

(10) Patent No.: US 12,130,202 B2
(45) Date of Patent: Oct. 29, 2024

(54) SEMI-PHYSICAL SIMULATION TEST BENCH AND TEST METHOD FOR MULTI-MACHINE PARALLEL OPERATION DEVICE OF GAS TURBINES

(71) Applicant: HARBIN ENGINEERING UNIVERSITY, Harbin (CN)

(72) Inventors: Zhitao Wang, Harbin (CN); Jian Li, Harbin (CN); Liang Ming, Harbin (CN); Shuying Li, Harbin (CN); Jiayi Ma, Harbin (CN); Tianhao Guan, Harbin (CN); Jiafan Luo, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/801,178

(22) PCT Filed: Jun. 28, 2022

(86) PCT No.: PCT/CN2022/101716
§ 371 (c)(1),
(2) Date: Aug. 19, 2022

(87) PCT Pub. No.: WO2023/274185
PCT Pub. Date: Jan. 5, 2023

(65) Prior Publication Data
US 2024/0192088 A1   Jun. 13, 2024

(30) Foreign Application Priority Data

Jun. 28, 2021 (CN) .......................... 202110718055.6

(51) Int. Cl.
*G01M 15/14* (2006.01)
*G01M 15/02* (2006.01)

(52) U.S. Cl.
CPC ............ *G01M 15/14* (2013.01); *G01M 15/02* (2013.01)

(58) Field of Classification Search
CPC .............................. G01M 15/14; G01M 15/02
See application file for complete search history.

(56) References Cited

FOREIGN PATENT DOCUMENTS

| CN | 102435945 A | 5/2012 |
|---|---|---|
| CN | 106482948 A | 3/2017 |

(Continued)

OTHER PUBLICATIONS

First Office Action issued to application CN202110718055.6, dated Aug. 26, 2022.

(Continued)

*Primary Examiner* — Erika J. Villaluna
(74) *Attorney, Agent, or Firm* — MARSHALL, GERSTEIN & BORUN LLP; Michael P. Furmanek

(57) ABSTRACT

The present disclosure provides a semi-physical simulation test bench and test method for a multi-machine parallel operation device of gas turbines. The gas turbines are all connected with gearbox shafts through SSS clutches, torque meters and couplers, and then a hydraulic dynamometer, an electric turbine dynamometer and a generator are independently or jointly driven through couplers and torque meters so as to charge a storage battery. Multi-shaft gearboxes comprise parallel operation gearboxes, and are connected with a bridging gearbox through couplers, electromagnetic clutches, supports, torque meters and couplers. The gas turbines can drive an electric dynamometer and the electric turbine dynamometer independently or cooperatively, so that the system has good operation characteristics under different working conditions. Meanwhile, the storage battery is additionally arranged, the flexibility of the test bench is improved, and the energy utilization rate is increased.

5 Claims, 3 Drawing Sheets

(56) References Cited

FOREIGN PATENT DOCUMENTS

| | | |
|---|---|---|
| CN | 108657406 A | 10/2018 |
| CN | 113551917 A | 10/2021 |
| WO | WO-2012052461 A1 | 4/2012 |

OTHER PUBLICATIONS

International Search Report issued to international application No. PCT/CN2022/101716, dated Sep. 2, 2022.

SEMI-PHYSICAL SIMULATION TEST BENCH AND TEST METHOD FOR MULTI-MACHINE PARALLEL OPERATION DEVICE OF GAS TURBINES

CROSS-REFERENCE TO RELATED APPLICATION

This is the United States national phase of International Patent Application No. PCT/CN2022/101716, filed Jun. 28, 2022, which claims priority to CN patent application No. 202110718055.6, filed Jun. 28, 2021, the entire contents of each of which are hereby incorporated by reference herein.

TECHNICAL FIELD

The present disclosure relates to a test bench and a test method for gas turbines, and specifically relates to a semi-physical simulation test bench and test method for gas turbines.

BACKGROUND ART

With the gradual decline in global oil reserves and the gradual stringency of global emission regulations, green traffic has become a great trend. Currently, the development direction of the automobile industry is inclining from fuel vehicles to hybrid vehicles and new energy vehicles, and automobiles are already growing green. In the ship industry and the shipping industry, green low emission is gradually changed, and a lot of shippers seek a novel power mode with low refitting cost, low operation cost and low maintenance cost. However, the actual effect of the novel power mode cannot be predicted without tests or debugging, so that tests are needed to verify the reliability of the novel power mode. However, the problems of high cost and high risk are caused by directly performing the all-physical test of a combined test run on the system, and the risk of damaging the control system is increased. Therefore, the test risk can be reduced by means of the simulation technology, the cost is saved, and the test efficiency is improved.

At present, common simulation technologies are mainly divided into digital simulation, semi-physical simulation and physical simulation (or called as "purely physical simulation"). The digital simulation is a process of abstracting system characteristics by using mathematical means and performing test researches and verification on a mathematical model on a computer. The semi-physical simulation is a process of establishing mathematical models such as control models for some parts of a research system, replacing some parts with real objects or physical models, and connecting the parts with the physical models to form a simulation loop for testing. The physical simulation (or called as "purely physical simulation") is the process of adopting physical models or real objects for the research system, and connecting the physical models or real objects to form a simulation loop for testing. In mathematical simulation, a part of systems are difficult to accurately model, interference such as noise is ignored in simulation, and the precision is not high. In the purely physical simulation, much work and more test equipment are performed before an actual test, but a large amount of work such as equipment manufacturing, installation and debugging needs to be performed, so that the structure is complex, the manufacturing cost is high, the model is difficult to reuse, and the universality is not high. The semi-physical simulation avoids the problems of high cost and low universality in physical simulation, and is closer to reality than digital simulation and high in simulation confidence, so that the semi-physical simulation is increasingly applied in the development process of the control system.

SUMMARY

The present disclosure aims to provide a semi-physical simulation test bench and test method for a multi-machine parallel operation device of gas turbines. The test bench and the test method are applicable to various different working conditions and more multifunctional and comprehensive.

The purpose of the present disclosure is realized as follows.

The present disclosure provides a semi-physical simulation test bench for a multi-machine parallel operation device of gas turbines. The test bench comprises a first simulation gas turbine, a third simulation gas turbine, a storage battery, an electric turbine dynamometer, a hydraulic dynamometer, a generator, a first parallel operation gearbox, a second parallel operation gearbox and a bridging gearbox, wherein the electric turbine dynamometer is connected with a first torque meter and the first parallel operation gearbox, the first simulation gas turbine, a first SSS clutch and a second torque meter are connected in sequence and connected with the first parallel operation gearbox, the hydraulic dynamometer is connected with a third torque meter and the second parallel operation gearbox, the storage battery, the generator and a first electromagnetic clutch are connected in sequence and connected with the second parallel operation gearbox, a second simulation gas turbine, a third SSS clutch and a fifth torque meter are connected in sequence and connected with the second parallel operation gearbox, the third simulation gas turbine, a second SSS clutch and a fourth torque meter are connected in sequence and connected with the first parallel operation gearbox, a sixth torque meter, a first support and a second electromagnetic clutch are connected in sequence, the sixth torque meter is connected with the bridging gearbox, the second electromagnetic clutch is connected with the first parallel operation gearbox, a seventh torque meter, a second support and a third electromagnetic clutch are connected in sequence, the seventh torque meter is connected with the bridging gearbox, and the third electromagnetic clutch is connected with the second parallel operation gearbox.

The present disclosure provides a semi-physical simulation test method for a multi-machine parallel operation device of gas turbines, wherein the working modes of the gas turbines are single-propeller propelling modes;

the single-propeller propelling modes comprise a single-machine single-propeller propelling mode, a double-machine single-propeller combined propelling mode, a three-machine single-propeller combined propelling mode and a single-propeller propelling auxiliary power generation mode;

firstly, in the single-machine single-propeller propelling mode, the first simulation gas turbine is in a running state, the first SSS clutch is closed, the second SSS clutch and the third SSS clutch are completely disconnected, and the first simulation gas turbine is connected with the first parallel operation gearbox through the second torque meter and then drives the electric turbine dynamometer through the first torque meter;

secondly, in the double-machine single-propeller combined propelling mode, the first simulation gas turbine and the second simulation gas turbine are in a running state, the first SSS clutch and the third SSS clutch are closed, the second SSS clutch is disconnected, the first simulation gas turbine is connected with the first parallel operation gearbox through the second torque meter and then drives the electric turbine dynamometer through the first torque meter, and the second simulation gas turbine is connected with the second parallel operation gearbox through the fifth torque meter, then connected with the bridging gearbox through the third electromagnetic clutch, the second support and the seventh torque meter, then connected with the first parallel operation gearbox through the sixth torque meter, the first support and the second electromagnetic clutch, and then connected with the electric turbine dynamometer through the first torque meter;

thirdly, in the three-machine single-propeller combined propelling mode, the first simulation gas turbine, the second simulation gas turbine and the third simulation gas turbine are all in a running state, the first SSS clutch and the third SSS clutch are both closed, the first simulation gas turbine is connected with the first parallel operation gearbox through the second torque meter and then drives the electric turbine dynamometer through the first torque meter, and the second simulation gas turbine is connected with the second parallel operation gearbox through the fifth torque meter, then connected with the bridging gearbox through the third electromagnetic clutch, the second support and the seventh torque meter, then connected with the first parallel operation gearbox through the sixth torque meter, the first support and the second electromagnetic clutch, and then connected with the electric turbine dynamometer through the first torque meter; and the third simulation gas turbine is connected with the first parallel operation gearbox through the fourth torque meter and then connected with the electric turbine dynamometer through the first torque meter; and fourthly, in the single-propeller propelling auxiliary power generation mode, in the three propelling modes such as the single-machine single-propeller propelling mode, the double-machine single-propeller combined propelling mode and the three-machine single-propeller combined propelling mode, the second parallel operation gearbox and the first electromagnetic clutch are connected with the generator to generate power, and the generated electric energy is stored in the storage battery to supply power to electric equipment for the test bench or motors.

The present disclosure provides a semi-physical simulation test method for a multi-machine parallel operation device of gas turbines, wherein the working modes of the gas turbines are double-propeller propelling modes, and the double-propeller propelling modes comprise a single-machine double-propeller propelling mode, a double-machine double-propeller combined propelling mode, a three-machine double-propeller combined propelling mode and a double-propeller propelling auxiliary power generation mode;

firstly, in the single-machine double-propeller propelling mode, the first simulation gas turbine is in a running state, the first SSS clutch is closed, the second SSS clutch and the third SSS clutch are completely disconnected, the first simulation gas turbine is connected with the first parallel operation gearbox through the second torque meter, at the moment, power is separated into two paths, and the first simulation gas turbine drives the electric turbine dynamometer through the first torque meter in the first path of power and is connected with the bridging gearbox through the second electromagnetic clutch, the first support and the sixth torque meter in the second path of power, then is connected with the second parallel operation gearbox through the seventh torque meter, the second support and the third electromagnetic clutch, and then drives the hydraulic dynamometer through the third torque meter;

secondly, in the double-machine double-propeller combined propelling mode, the first simulation gas turbine and the second simulation gas turbine are in a running state, the first SSS clutch and the third SSS clutch are closed, the second SSS clutch is disconnected, the first simulation gas turbine is connected with the first parallel operation gearbox through the second torque meter, at the moment, power is separated into two paths, the first simulation gas turbine drives the electric turbine dynamometer through the first torque meter in the first path of power and is connected with the bridging gearbox through the second electromagnetic clutch, the first support and the sixth torque meter in the second path of power, then is connected with the second parallel operation gearbox through the seventh torque meter, the second support and the third electromagnetic clutch, and then drives the hydraulic dynamometer through the third torque meter; and the second simulation gas turbine is connected with the second parallel operation gearbox through the fifth torque meter, at the moment, power is separated into two paths, and the second simulation gas turbine drives the hydraulic dynamometer through the third torque meter in the first path of power and is connected with the bridging gearbox through the third electromagnetic clutch, the second support and the seventh torque meter in the second path of power, then is connected with the first parallel operation gearbox through the sixth torque meter, the first support and the second electromagnetic clutch, and then drives the electric turbine dynamometer through the first torque meter;

thirdly, in the three-machine double-propeller combined propelling mode, the first simulation gas turbine, the second simulation gas turbine and the third simulation gas turbine are all in a running state, the first SSS clutch and the third SSS clutch are both closed, the first simulation gas turbine is connected with the first parallel operation gearbox through the second torque meter, at the moment, power is separated into two paths, the first simulation gas turbine drives the electric turbine dynamometer through the first torque meter in the first path of power and is connected with the bridging gearbox through the second electromagnetic clutch, the first support and the sixth torque meter in the second path of power, then is connected with the second parallel operation gearbox through the seventh torque meter, the second support and the third electromagnetic clutch, and then drives the hydraulic dynamometer through the third torque meter; the second simulation gas turbine is connected with the second parallel operation gearbox through the fifth torque meter, at the moment, power is separated into two paths, the second simulation gas turbine drives the hydraulic dynamometer through the third torque meter in the first path of power and is connected with the bridging gearbox through the third electromagnetic clutch, the second support and the seventh torque meter in the second path of power, then is connected with the first parallel operation gearbox through the sixth torque meter, the first support and the second electromagnetic clutch, and then drives the electric turbine dynamometer through the first torque meter; and the third simulation gas turbine is connected with the first parallel operation gearbox through the fourth torque meter, at the moment, power is separated into two paths, the third simulation gas turbine drives the electric turbine dynamometer through the first torque meter in the first path of power and is connected with the bridging gearbox through the second electromagnetic clutch, the first support and the sixth torque meter in the second path of power, then is connected with the second parallel operation gearbox through the seventh torque meter, the second support and the third electromagnetic clutch, and then drives the hydraulic dynamometer through the third torque meter; and fourthly, a part of power can be separated from the three double-propeller propelling modes such as the single-machine double-propeller propelling mode, the double-machine double-propeller combined propelling mode and the three-machine double-propeller combined propelling mode to assist the generator in generating power through the corresponding parallel operation gearbox, coupler and electromagnetic clutch, and the generated electric energy can be stored in the storage battery to supply power to electric equipment for the test bench or motors.

The present disclosure provides a semi-physical simulation test method for a multi-machine parallel operation device of gas turbines, wherein the working modes of the gas turbines comprise electric propelling modes, and the electric propelling modes comprise a storage battery power supply propelling mode and a laboratory power supply propelling mode;

firstly, in the storage battery power supply propelling mode, the storage battery drives the first simulation gas turbine, the second simulation gas turbine and the third simulation gas turbine to be all in a running state, the first SSS clutch and the third SSS clutch are both closed, and the first simulation gas turbine is connected with the first parallel operation gearbox through the second torque meter and then drives the electric turbine dynamometer through the first torque meter; the second simulation gas turbine is connected with the second parallel operation gearbox through the fifth torque meter and then drives the hydraulic dynamometer through the third torque meter; and the third gas turbine is connected with the first parallel operation gearbox through the fourth torque meter, at the moment, power is separated into two paths, and the third simulation gas turbine drives the electric turbine dynamometer through the first torque meter in the first path of power and reaches the bridging gearbox through the second electromagnetic clutch, the first support and the sixth torque meter in the second path of power, then is connected with the second parallel operation gearbox through the seventh torque meter, the second support and the third electromagnetic clutch, and then drives the hydraulic dynamometer through the third torque meter; and secondly, in the laboratory power supply propelling mode, a laboratory power supply drives the motors to be in a running state, the three simulation gas turbines such as the first simulation gas turbine, the second simulation gas turbine and the third simulation gas turbine are all in a running state, the first SSS clutch and the third SSS clutch are both closed, and the first simulation gas turbine is connected with the first parallel operation gearbox through the second torque meter and then drives the electric turbine dynamometer through the first torque meter; the second simulation gas turbine is connected with the second parallel operation gearbox through the fifth torque meter and then drives the hydraulic dynamometer through the third torque meter; and the third gas turbine is connected with the first parallel operation gearbox through the fourth torque meter, at the moment, power is separated into two paths, the third simulation gas turbine drives the electric turbine dynamometer through the first torque meter in the first path of power and reaches the bridging gearbox through the second electromagnetic clutch, the first support and the sixth torque meter in the second path of power, then is connected with the second parallel operation gearbox through the seventh torque meter, the second support and the third electromagnetic clutch, and then drives the hydraulic dynamometer through the third torque meter.

The present disclosure has the following advantages.

Firstly, the power coverage is large in area, the power requirement of all working conditions of a ship can be met, and the gas turbine has the obvious advantages of high single-machine power, reliable operation, simple and compact structure, fast starting and high automation degree, so that waste heat can be comprehensively utilized, and the energy utilization rate is greatly improved. The motor can run at low speed and high power, and a speed reducer can be omitted to directly drive large load. Soft start and soft stop can be achieved, the braking characteristic is good, and original mechanical braking can be omitted. The reliability is high, the noise is low, the vibration is small, and the operation is smooth. The hydraulic dynamometer and the electric turbine dynamometer can perform power feedback through a measuring and control device, and the output power of a power machine is absorbed and transmitted, so that the energy utilization rate is improved.

Secondly, the generator is used as a load to receive the power output of the hybrid power device, power is generated outwards, and a part of electric energy is stored in the storage battery for standby application. The storage battery can be used as a motor in the energy pool driving system of the isolated system to work and can also be used as a ship storage energy source, so that efficient utilization and self-production and self-use of energy sources are achieved.

Thirdly, the control system of the test bench comprises a security and protection system, a first upper computer, a second upper computer, a hydraulic dynamometer driving instrument and a remote I/O communication module. The first upper computer is responsible for working in the automatic mode, the prime motor is connected with the controller, and all data are input and output through the board card. The second upper computer is responsible for working in the manual mode. The second upper computer communicates with the I/O interface through DP communication and communicates with the hydraulic dynamometer and the electric turbine dynamometer through CAN communication. The system can be controlled through the two methods, and the fault tolerance rate is high. The security and protection system comprises rotating speed limitation, torque limitation, lubricating oil pressure limitation, lubricating oil temperature limitation and vibration limitation of the transmission shaft in the X direction and the Y direction. During operation, the first upper computer and the second upper computer can judge whether the current operation state is safe or not according to the limitation. If the current operation state exceeds the limitation, emergency braking is adopted, and the security assurance is high.

Fourthly, a monitoring control system of the test bench comprises a data processing simulation machine, an execution mechanism control system, an upper computer and a security and protection detector (for detecting the smoke, water and electricity states of the test bench). The monitoring control system not only can monitor and control all parts of the test bench, but also can detect the smoke, water and electricity states of the test bench, so that the accuracy of the test and the safety of test staff are guaranteed in an all-around mode.

Fifthly, various operation modes are described, and the power output of the ship under different working conditions can be met. In low working conditions, a single gas turbine is selected as a prime motor to output power, so that higher efficiency can be obtained. In medium working conditions, an auxiliary power generation mode can be selected. In high working conditions, double gas turbines can be selected for power output in a combined mode. In high working conditions, double gas turbines can be selected for power output in a combined mode. Different power combinations are selected in different working conditions, so that the power matching is more reasonable. Therefore, the test bench is more multifunctional and comprehensive.

Figure 1:
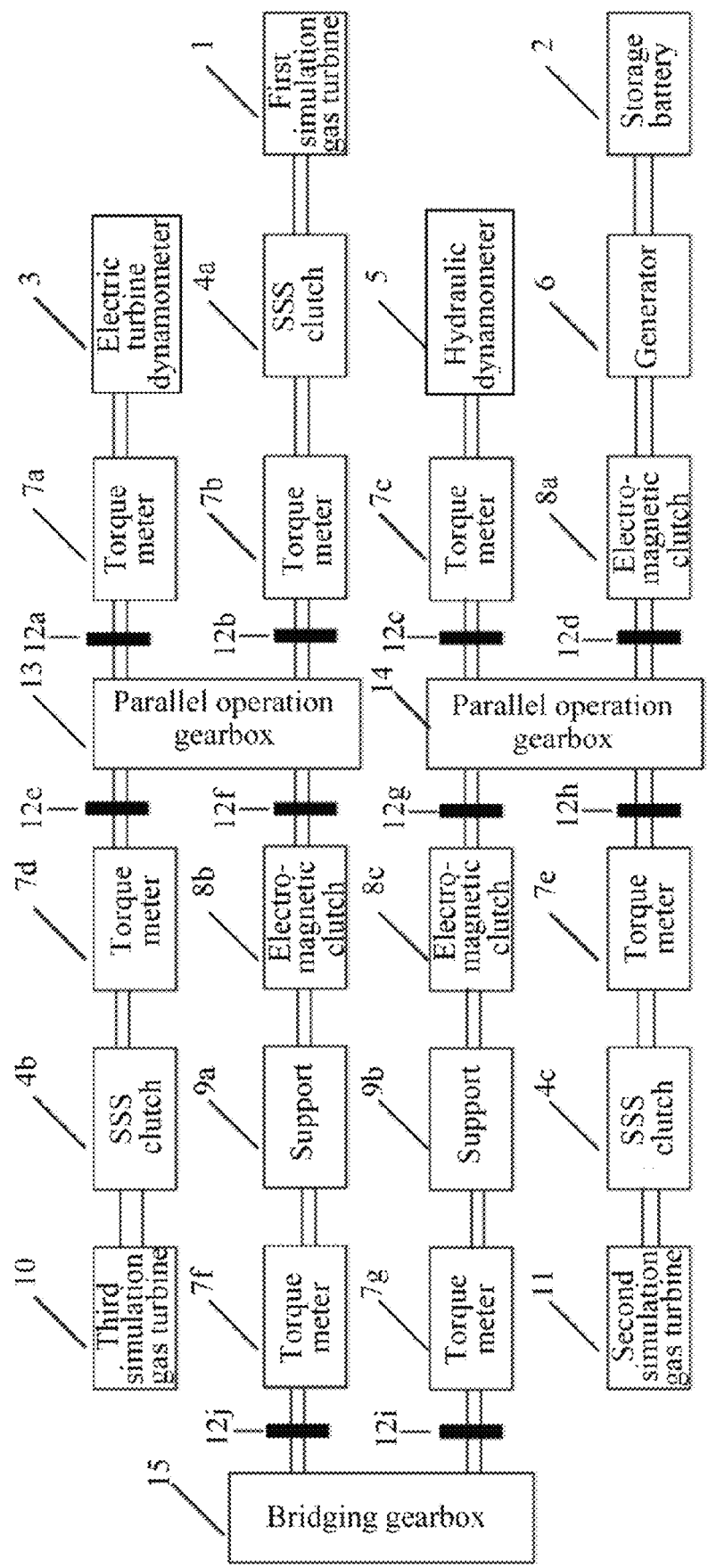
FIG. 1 is a structural schematic diagram of the present disclosure.

REFERENCE SIGNS IN THE ATTACHED FIGURES 1, first simulation gas turbine; 2, storage battery; 3, electric turbine dynamometer; 4a, first SSS clutch; 4b, second SSS clutch; 4c, third SSS clutch; 5, hydraulic dynamometer; 6, generator; 7a, first torque meter; 7b, second torque meter; 7c, third torque meter; 7d, fourth torque meter; 7e, fifth torque meter; 7f, sixth torque meter; 7g, seventh torque meter; 8a, first electromagnetic clutch; 8b, second electromagnetic clutch; 8c, third electromagnetic clutch; 9a, first support; 9b, second support; 10, third simulation gas turbine; 11, second simulation gas turbine; 12a, first coupler; 12b, second coupler; 12c, third coupler; 12d, fourth coupler; 12e, fifth coupler; 12f, sixth coupler; 12g, seventh coupler; 12h, eighth coupler; 12i, ninth coupler; 12j, tenth coupler; 13, first parallel operation gearbox; 14, second parallel operation gearbox; 15, bridging gearbox; 16, data processing simulation machine; 17, upper computer; 18, first motor frequency converter; 19, second motor frequency converter; 20, third motor frequency converter; 21, generator controller; 22, electric turbine dynamometer controller; 23, hydraulic dynamometer controller; 24, security and protection detector; 25a, first motor; 25b, second motor; and 25c, third motor.

DETAILED DESCRIPTION OF THE EMBODIMENTS

The present disclosure is described in more detail with reference to the attached figures.

The embodiment provides a semi-physical simulation test bench for a multi-machine parallel operation device of gas turbines. In combination with FIG. 1 to FIG. 3, the embodiment is specifically explained by taking a diesel-fuel-electricity series-parallel ship hybrid power test bench with a data communication control system as an example. The test bench comprises a first simulation gas turbine 1, a storage battery 2, an electric turbine dynamometer 3, a first SSS clutch 4a, a second SSS clutch 4b, a third SSS clutch 4c, a hydraulic dynamometer 5, a generator 6, a first torque meter 7a, a second torque meter 7b, a third torque meter 7c, a fourth torque meter 7d, a fifth torque meter 7e, a sixth torque meter 7f, a seventh torque meter 7g, a first electromagnetic clutch 8a, a second electromagnetic clutch 8b, a third electromagnetic clutch 8c, a first support 9a, a second support 9b, a third simulation gas turbine 10, a second simulation gas turbine 11, a first coupler 12a, a second coupler 12b, a third coupler 12c, a fourth coupler 12d, a fifth coupler 12e, a sixth coupler 12f, a seventh coupler 12g, eighth couplers 12h, a ninth coupler 12i, a tenth coupler 12j, a first parallel operation gearbox 13, a second parallel operation gearbox 14, a bridging gearbox 15. The connected relation is as follows. The first simulation gas turbine 1 is connected with the first parallel operation gearbox 13 through the second torque meter 7b and the second coupler 12b. The first parallel operation gearbox 13 is connected with the first coupler 12a, and drives the electric turbine dynamometer 3 through the first torque meter 7a. The second simulation gas turbine 11 is connected with the second parallel operation gearbox 14 through the fifth torque meter 7e and the eighth coupler 12h. The second parallel operation gearbox 14 drives the hydraulic dynamometer 5 through the third coupler 12c and the third torque meter 7c. The third simulation gas turbine 10 is connected with the first parallel operation gearbox 13 through the fourth torque meter 7d and the fifth coupler 12e. At the moment, power is separated into two paths. The third simulation gas turbine 10 drives the electric turbine dynamometer 3 through the first coupler 12a and the first torque meter 7a in the first path of power and reaches the bridging gearbox 15 through the sixth coupler 12f, the second electromagnetic clutch 8b, the first support 9a, the sixth torque meter 7f and the tenth coupler 12j in the second path of power. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer 5 through the third coupler 12c and the third torque meter 7c.

Figure 2:
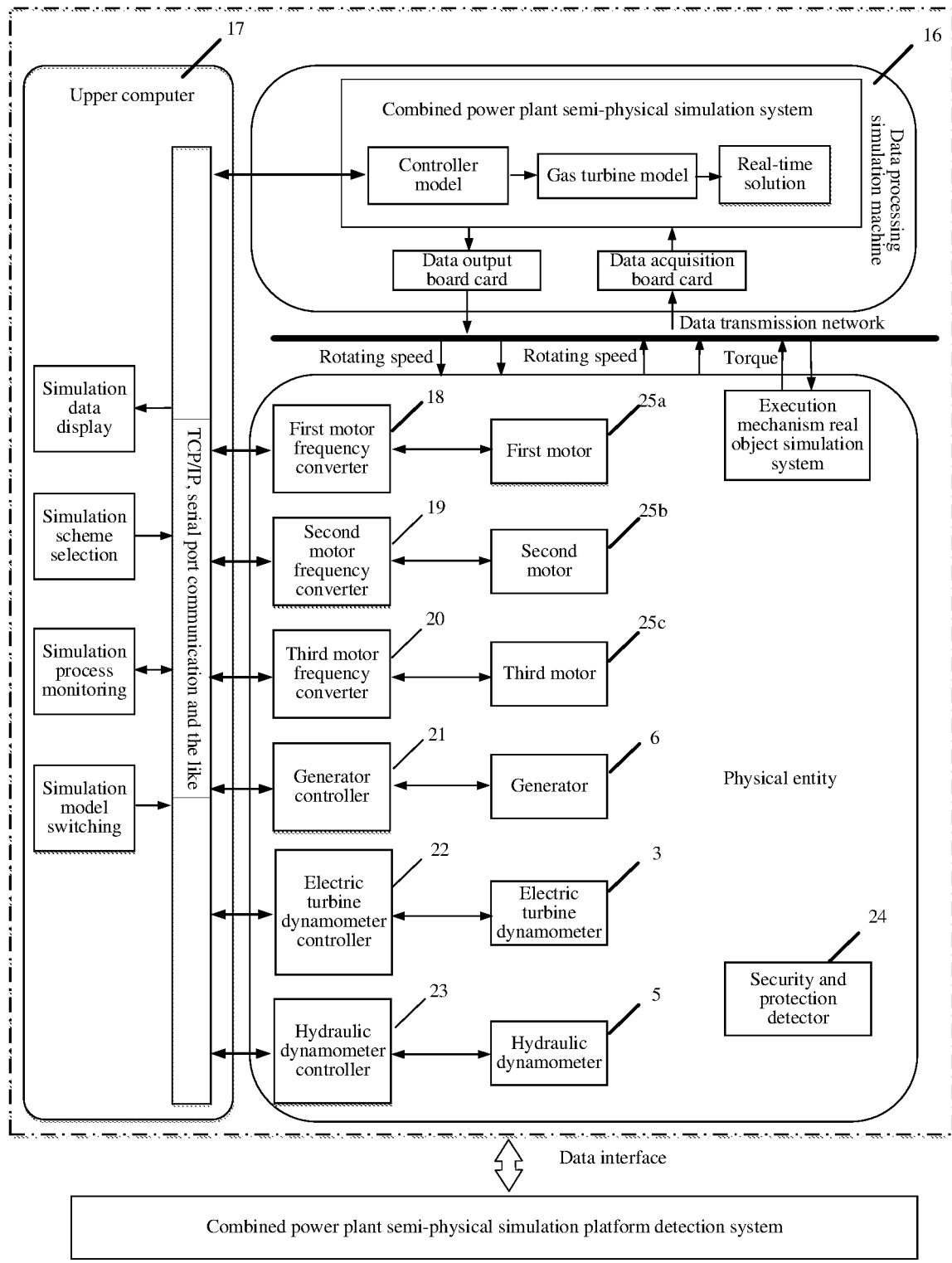
FIG. 2 is a schematic diagram of a monitoring control system of a test bench in the present disclosure.

Referring to FIG. 2, a monitoring control system of the test bench comprises a data processing simulation machine 16, an execution mechanism control system, an upper computer 17 and a security and protection detector 24 (for detecting the smoke, water and electricity states of the test bench). Wherein, Functionally, the data processing simulation machine 16 can perform real-time solution calculation from a controller model to a prime mover model, and performs data acquisition and data output.

The execution mechanism control system comprises a first motor 25a, a second motor 25b, a third motor 25c, a generator 6, an electric turbine dynamometer 3, a hydraulic dynamometer 5, a first motor frequency converter 18, a second motor frequency converter 19, a third motor frequency converter 20, a generator controller 21, an electric turbine dynamometer controller 22 and a hydraulic dynamometer controller 23. The execution mechanism control system has the functions of monitoring and controlling all the machines, transmitting rotating speed and torque signals to the data processing simulation machine 16 through a data transmission network, and transmitting the signals to the upper computer 17 through TCP/IP (Transmission Control Protocol/Internet Protocol), serial port communication and the like.

Figure 3:
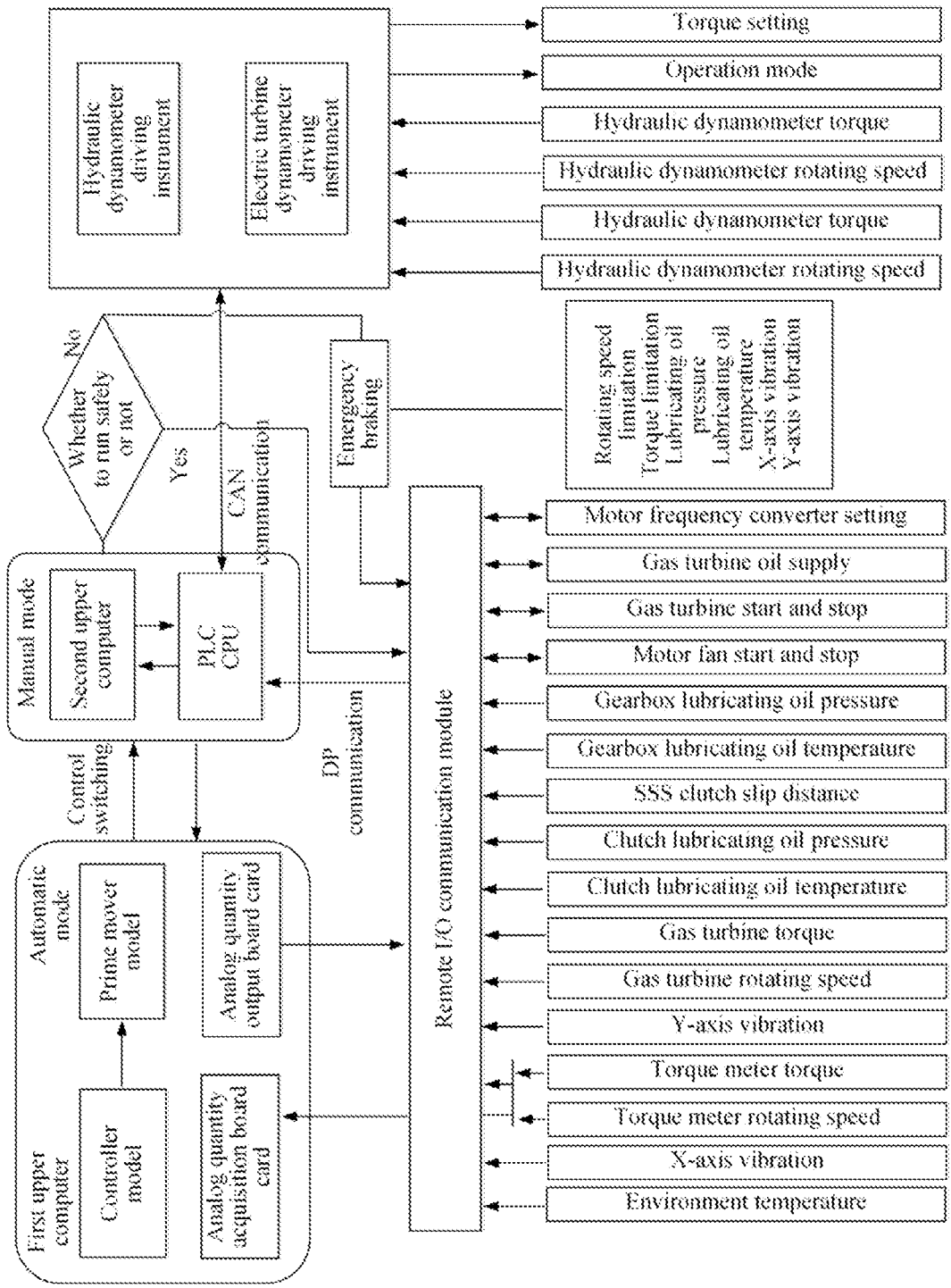
FIG. 3 is a control logic schematic diagram of a test bench in the present disclosure.

The upper computer 17 has the functions of data display analysis, scheme design, process monitoring and model establishment, and is used for analyzing, monitoring and researching data of the data processing simulation machine and the execution mechanism control system. As shown in FIG. 3, the upper computer has an automatic mode and a manual mode, and can control the automatic mode and the manual mode to be switched, wherein the automatic mode corresponds to a first upper computer module in the upper computer 17, namely a "first upper computer" in FIG. 3, and the manual mode corresponds to a second upper computer module in the upper computer 17, namely a "second upper computer" in FIG. 3.

FIG. 3 is a control logic schematic diagram of a test bench in the present disclosure. Wherein, the upper computer 17 can control the automatic mode and the manual mode to be switched and performs monitoring control through a remote I/O communication module on environment temperature, X-axis vibration, torque meter rotating speed, torque meter torque, Y-axis vibration, gas turbine and motor rotating speeds, gas turbine and motor torques, clutch lubricating oil temperature, clutch lubricating oil pressure, SSS clutch slip distance, gearbox lubricating oil temperature, gearbox lubricating oil pressure, motor fan start and stop, gas turbine and motor start and stop, gas turbine oil supply and motor frequency converter setting. Moreover, whether emergency braking is adopted or not is determined by judging rotating speed limitation, torque limitation, lubricating oil pressure, lubricating oil temperature, X-axis vibration and Y-axis vibration. The upper computer 17 also monitors and controls the hydraulic dynamometer 5 and the electric turbine dynamometer 3 through CAN communication, including setting the hydraulic dynamometer rotating speed, the hydraulic dynamometer torque, the electric turbine dynamometer rotating speed, the electric turbine dynamometer torque, the operation mode and the torque.

In the embodiment, the first parallel operation gearbox 13 and the second parallel operation gearbox 14 are both multi-shaft gearboxes.

The embodiment further provides a semi-physical simulation test method for a multi-machine parallel operation device of gas turbines. The working modes of the gas turbines are single-propeller propelling modes, and the single-propeller propelling modes comprise a single-machine single-propeller propelling mode, a double-machine single-propeller combined propelling mode, a three-machine single-propeller combined propelling mode and a single-propeller propelling auxiliary power generation mode. Wherein, Firstly, in the single-machine single-propeller propelling mode, the first simulation gas turbine 1 is in a running state, the first SSS clutch 4a is closed, and the second SSS clutch 4b and the third SSS clutch 4c are completely disconnected. The first simulation gas turbine 1 is connected with the first parallel operation gearbox 13 through the second torque meter 7b and the second coupler 12b. The first parallel operation gearbox 13 is connected with the first coupler 12a. The first coupler 12a drives the electric turbine dynamometer 3 through the first torque meter 7a.

Secondly, in the double-machine single-propeller combined propelling mode, the first simulation gas turbine 1 and the second simulation gas turbine 11 are in a running state, the second SSS clutch 4b and the third SSS clutch 4c are closed, and the first SSS clutch 4a is disconnected. The first simulation gas turbine 1 is connected with the first parallel operation gearbox 13 through the second torque meter 7b and the second coupler 12b. The first parallel operation gearbox 13 is connected with the first coupler 12a. The first simulation gas turbine 1 drives the electric turbine dynamometer 3 through the first torque meter 7a. The second simulation gas turbine 11 is connected with the second parallel operation gearbox 14 through the third SSS clutch 4c, the fifth torque meter 7e and the eighth coupler 12h. The second parallel operation gearbox 14 is connected with the bridging gearbox 15 through the seventh coupler 12g, the third electromagnetic clutch 8c, the second support 9b, the seventh torque meter 7g and the ninth coupler 12i. The bridging gearbox 15 is connected with the first parallel operation gearbox 13 through the tenth coupler 12j, the sixth torque meter 7f, the first support 9a, the second electromagnetic clutch 8b and the sixth coupler 12f. The first parallel operation gearbox 13 is connected with the electric turbine dynamometer 3 through the first coupler 12a and the first torque meter 7a.

Thirdly, in the three-machine single-propeller combined propelling mode, the three simulation gas turbines such as the first simulation gas turbine 1, the second simulation gas turbine 11 and the third simulation gas turbine 10 are all in a running state, and the first SSS clutch 4a, the second SSS clutch 4b and the third SSS clutch 4c are all closed. The first simulation gas turbine 1 is connected with the first parallel operation gearbox 13 through the second torque meter 7b and the second coupler 12b. The first parallel operation gearbox 13 is connected with the first coupler 12a. The first coupler 12a drives the electric turbine dynamometer 3 through the first torque meter 7a. The second simulation gas turbine 11 is connected with the second parallel operation gearbox 14 through the fifth torque meter 7e and the eighth coupler 12h. The second parallel operation gearbox 14 is connected with the bridging gearbox 15 through the seventh coupler 12g, the third electromagnetic clutch 8c, the second support 9b, the seventh torque meter 7g and the ninth coupler 12i, then connected with the first parallel operation gearbox through the sixth torque meter, the first support and the second electromagnetic clutch. The bridging gearbox 15 is connected with the first parallel operation gearbox 13 through the tenth coupler 12j, the sixth torque meter 7f, the first support 9a, the second electromagnetic clutch 8b and the sixth coupler 12f. The first parallel operation gearbox 13 is connected with the electric turbine dynamometer 3 through the first coupler 12a and the first torque meter 7a. The third simulation gas turbine 10 is connected with the first parallel operation gearbox 13 through the fourth torque meter 7d and the fifth coupler 12e. The first parallel operation gearbox 13 is connected with the electric turbine dynamometer 3 through the first coupler 12a and the first torque meter 7a.

Fourthly, in the single-propeller propelling auxiliary power generation mode, a part of power can be separated from the three single-propeller propelling modes to assist the generator 6 in generating power through the second parallel operation gearbox 14, the fourth coupler 12d and the first electromagnetic clutch 8a, and the generated electric energy can be stored in the storage battery 2 to supply power to electric equipment for the test bench or motors.

The embodiment provides a semi-physical simulation test method for a multi-machine parallel operation device of gas turbines, wherein the working modes of the gas turbines are double-propeller propelling modes, and the double-propeller propelling modes comprise a single-machine double-propeller propelling mode, a double-machine double-propeller combined propelling mode, a three-machine double-propeller combined propelling mode and a double-propeller propelling auxiliary power generation mode. Wherein, Firstly, in the single-machine single-propeller propelling mode, the first simulation gas turbine 1 is in a running state, the first SSS clutch 4a is closed, and the second SSS clutch 4b and the third SSS clutch 4c are completely disconnected. The first simulation gas turbine 1 is connected with the first parallel operation gearbox 13 through the first SSS clutch 4a, the second torque meter 7b and the second coupler 12b. At the moment, power is separated into two paths. The first simulation gas turbine 1 is connected with the first coupler 12a in the first path of power, and drives the electric turbine dynamometer 3 through the first torque meter 7a. The first simulation gas turbine 1 is connected with the bridging gearbox 15 through the sixth coupler 12f, the second electromagnetic clutch 8b, the first support 9a, the sixth torque meter 7f and the tenth coupler 12j. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer 5 through the third coupler 12c and the third torque meter 7c.

Secondly, in the double-machine double-propeller combined propelling mode, the first simulation gas turbine 1 and the second simulation gas turbine 11 are in a running state, the first SSS clutch 4a and the third SSS clutch 4c are closed, and the second SSS clutch 4b is disconnected, wherein the first simulation gas turbine 1 is connected with the first parallel operation gearbox 13 through the first SSS clutch 4a, the second torque meter 7b and the second coupler 12b. At the moment, power is separated into two paths. The first simulation gas turbine 1 is connected with the first coupler 12a in the first path of power, and the first coupler 12a drives the electric turbine dynamometer 3 through the first torque meter 7a. The first simulation gas turbine 1 is connected with the bridging gearbox 15 through the sixth coupler 12f, the second electromagnetic clutch 8b, the first support 9a, the sixth torque meter 7f and the tenth coupler 12j in the second path of power. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer through the third coupler 12c and the third torque meter 7c. The second simulation gas turbine 11 is connected with the second parallel operation gearbox 14 through the fifth torque meter 7e and the eighth coupler 12h. At the moment, power is separated into two paths. The second simulation gas turbine 11 drives the hydraulic dynamometer 5 through the third coupler 12c and the third torque meter 7c in the first path of power and is connected with the bridging gearbox 15 through the seventh coupler 12g, the third electromagnetic clutch 8c, the second support 9b, the seventh torque meter 7g and the ninth coupler 12i in the second path of power. The bridging gearbox 15 is connected with the first parallel operation gearbox 13 through the tenth coupler 12j, the sixth torque meter 7f, the first support 9a, the second electromagnetic clutch 8b and the sixth coupler 12f. The first parallel operation gearbox 13 drives the electric turbine dynamometer 3 through the first coupler 12a and the first torque meter 7a.

Thirdly, in the three-machine double-propeller combined propelling mode, the three simulation gas turbines such as the first simulation gas turbine 1, the second simulation gas turbine 11 and the third simulation gas turbine 10 are all in a running state, the first SSS clutch 4a, the second SSS clutch 4b and the third SSS clutch 4c are all closed, and other clutches are completely disconnected, wherein the first simulation gas turbine 1 is connected with the first parallel operation gearbox 12 through the first SSS clutch 4a, the second torque meter 7b and the second coupler 12b in sequence. At the moment, power is separated into two paths. The first simulation gas turbine 1 is connected with the first coupler 12a in the first path of power, and the first coupler 12a drives the electric turbine dynamometer 3 through the first torque meter 7a. The first simulation gas turbine 1 is connected with the bridging gearbox 15 through the sixth coupler 12f, the second electromagnetic clutch 8b, the first support 9a, the sixth torque meter 7f and the tenth coupler 12j in the second path of power. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer through the third coupler 12c and the third torque meter 7c. The second simulation gas turbine 11 is connected with the second parallel operation gearbox 14 through the fifth torque meter 7e and the eighth coupler 12h. At the moment, power is separated into two paths. The second simulation gas turbine 11 drives the hydraulic dynamometer 5 through the third coupler 12c and the third torque meter 7c in the first path of power and is connected with the bridging gearbox 15 through the seventh coupler 12g, the third electromagnetic clutch 8c, the second support 9b, the seventh torque meter 7g and the ninth coupler 12i in the second path of power. The bridging gearbox 15 is connected with the first parallel operation gearbox 13 through the tenth coupler 12j, the sixth torque meter 7f, the first support 9a, the second electromagnetic clutch 8b and the sixth coupler 12f. The first parallel operation gearbox 13 drives the electric turbine dynamometer 3 through the first coupler 12a and the first torque meter 7a. The third simulation gas turbine 10 is connected with the first parallel operation gearbox 13 through the fourth torque meter 7d and the fifth coupler 12e. At the moment, power is separated into two paths. The third simulation gas turbine 10 drives the electric turbine dynamometer 3 through the first coupler 12a and the first torque meter 7a in the first path of power and reaches the bridging gearbox 15 through the sixth coupler 12f, the second electromagnetic clutch 8b, the first support 9a, the sixth torque meter 7f and the tenth coupler 12j in the second path of power. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer 5 through the third coupler 12c and the third torque meter 7c.

Fourthly, in the double-propeller propelling auxiliary power generation mode, a part of power can be separated from the three double-propeller propelling modes to assist the generator 6 in generating power through the second parallel operation gearbox 14, the fourth coupler 12d and the first electromagnetic clutch 8a, and the generated electric energy can be stored in the storage battery 2 to supply power to electric equipment for the test bench or motors.

In the semi-physical simulation test method for a multi-machine parallel operation device of gas turbines provided by the embodiment, the working modes of the simulation gas turbines further comprise electric propelling modes, and the electric propelling modes comprise a storage battery power supply propelling mode and a laboratory power supply propelling mode, wherein Firstly, in the storage battery power supply propelling mode, the storage battery is sufficient in SOC, and drives the simulation gas turbines to be in a running state. The three simulation gas turbines such as the first simulation gas turbine 1, the second simulation gas turbine 11 and the third simulation gas turbine 10 are all in a running state, the first SSS clutch 4a, the second SSS clutch 4b and the third SSS clutch 4c are all closed, and other clutches are completely disconnected, wherein the first simulation gas turbine 1 is connected with the first parallel operation gearbox 13 through the first SSS clutch 4a, the second torque meter 7b and the second coupler 12b in sequence. The first parallel operation gearbox 13 is connected with the first coupler 12a. The first coupler 12a drives the electric turbine dynamometer 3 through the first torque meter 7a. The second simulation gas turbine 11 is connected with the second parallel operation gearbox 14 through the third SSS clutch 4c, the fifth torque meter 7e and the eighth coupler 12h. The second parallel operation gearbox 14 drives the hydraulic dynamometer 5 through the third coupler 12c and the third torque meter 7c. The third simulation gas turbine 10 is connected with the first parallel operation gearbox 13 through the second SSS clutch 4b, the fourth torque meter 7d and the fifth coupler 12e in sequence. At the moment, power is separated into two paths. The third simulation gas turbine 10 drives the electric turbine dynamometer 3 through the first coupler 12a and the first torque meter 7a in the first path of power and reaches the bridging gearbox 15 through the sixth coupler 12f, the second electromagnetic clutch 8b, the first support 9a, the sixth torque meter 7f and the tenth coupler 12j in the second path of power. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer 5 through the third coupler 12c and the third torque meter 7c.

Secondly, in the laboratory power supply propelling mode, a laboratory power supply drives the motors to be in a running state, the three simulation gas turbines such as the first simulation gas turbine 1, the second simulation gas turbine 11 and the third simulation gas turbine 10 are all in a running state, the first SSS clutch 4a, the second SSS clutch 4b and the third SSS clutch 4c are all closed, and other clutches are completely disconnected, wherein the first simulation gas turbine 1 is connected with the first parallel operation gearbox 13 through the first SSS clutch 4a, the second torque meter 7b and the second coupler 12b in sequence. The first parallel operation gearbox 13 is connected with the first coupler 12a. The first coupler 12a drives the electric turbine dynamometer 3 through the first torque meter 7a. The second simulation gas turbine 11 is connected with the second parallel operation gearbox 14 through the third SSS clutch 4c, the fifth torque meter 7e and the eighth coupler 12h. The second parallel operation gearbox 14 drives the hydraulic dynamometer 5 through the third coupler 12c and the third torque meter 7c. The third simulation gas turbine 10 is connected with the first parallel operation gearbox 13 through the second SSS clutch 4b, the fourth torque meter 7d and the fifth coupler 12e in sequence. At the moment, power is separated into two paths. The third simulation gas turbine 10 drives the electric turbine dynamometer 3 through the first coupler 12a and the first torque meter 7a in the first path of power and reaches the bridging gearbox 15 through the sixth coupler 12f, the second electromagnetic clutch 8b, the first support 9a, the sixth torque meter 7f and the tenth coupler 12j in the second path of power. The bridging gearbox 15 is connected with the second parallel operation gearbox 14 through the ninth coupler 12i, the seventh torque meter 7g, the second support 9b, the third electromagnetic clutch 8c and the seventh coupler 12g. The second parallel operation gearbox 14 drives the hydraulic dynamometer 5 through the third coupler 12c and the third torque meter 7c.

Therefore, according to the semi-physical simulation test bench and test method for a multi-machine parallel operation device of gas turbines provided by the technical scheme, the gas turbines are all connected with gearbox shafts through SSS clutches, torque meters and couplers, and then a hydraulic dynamometer, an electric turbine dynamometer and a generator are independently or jointly driven through couplers and torque meters so as to charge a storage battery. Multi-shaft gearboxes comprise parallel operation gearboxes, and are connected with a bridging gearbox through couplers, electromagnetic clutches, supports, torque meters and couplers. The gas turbines can drive an electric dynamometer and the electric turbine dynamometer independently or cooperatively, so that the system has good operation characteristics under different working conditions. Meanwhile, the storage battery is additionally arranged, the flexibility of the test bench is improved, and the energy utilization rate is increased.

What is claimed is:

1. A semi-physical simulation test bench for a multi-machine parallel operation device of gas turbines, comprising a first simulation gas turbine, a second simulation gas turbine, a third simulation gas turbine, a storage battery, an electric turbine dynamometer, a hydraulic dynamometer, a generator, a first parallel operation gearbox, a second parallel operation gearbox and a bridging gearbox;
wherein the electric turbine dynamometer is connected with a first torque meter and the first parallel operation gearbox; the first simulation gas turbine, a first SSS clutch and a second torque meter are connected in sequence and connected with the first parallel operation gearbox; the hydraulic dynamometer is connected with a third torque meter and the second parallel operation gearbox; the storage battery, the generator and a first electromagnetic clutch are connected in sequence and connected with the second parallel operation gearbox; the second simulation gas turbine, a third SSS clutch and a fifth torque meter are connected in sequence and connected with the second parallel operation gearbox; the third simulation gas turbine, a second SSS clutch and a fourth torque meter are connected in sequence and connected with the first parallel operation gearbox; after a sixth torque meter, a first support and a second electromagnetic clutch are connected in sequence, the sixth torque meter is connected with the bridging gearbox, and the second electromagnetic clutch is connected with the first parallel operation gearbox; and after a seventh torque meter, a second support and a third electromagnetic clutch are connected in sequence, the seventh torque meter is connected with the bridging gearbox, and the third electromagnetic clutch is connected with the second parallel operation gearbox.

2. A semi-physical simulation test method for a multi-machine parallel operation device of gas turbines, wherein the working modes of the gas turbines comprise electric propelling modes, and the electric propelling modes comprise a storage battery power supply propelling mode and a laboratory power supply propelling mode;

firstly, in a storage battery power supply propelling mode, the storage battery drives simulation gas turbines to be in a running state, three simulation gas turbines such as a first simulation gas turbine, a second simulation gas turbine and a third simulation gas turbine are all in a running state; a first SSS clutch and a third SSS clutch are both closed, and the first simulation gas turbine is connected with a first parallel operation gearbox through a second torque meter and then drives an electric turbine dynamometer through a first torque meter; the second simulation gas turbine is connected with a second parallel operation gearbox through a fifth torque meter and then drives a hydraulic dynamometer through a third torque meter; and the third simulation gas turbine is connected with the first parallel operation gearbox through a fourth torque meter, power is separated into two paths, the third simulation gas turbine drives the electric turbine dynamometer through the first torque meter in a first path of power; and reaches a bridging gearbox through a second electromagnetic clutch, a first support and a sixth torque meter in a second path of power; then is connected with the second parallel operation gearbox through a seventh torque meter, a second support and a third electromagnetic clutch, and then drives the hydraulic dynamometer through the third torque meter; and secondly, in the laboratory power supply propelling mode, a laboratory power supply drives motors to be in a running state, the three simulation gas turbines such as the first simulation gas turbine, the second simulation gas turbine and the third simulation gas turbine are all in a running state; a first SSS clutch and a third SSS clutch are both closed, and the first simulation gas turbine is connected with the first parallel operation gearbox through the second torque meter and then drives the electric turbine dynamometer through the first torque meter; the second simulation gas turbine is connected with the second parallel operation gearbox through the fifth torque meter and then drives the hydraulic dynamometer through the third torque meter; and the third simulation gas turbine is connected with the first parallel operation gearbox through the fourth torque meter, power is separated into two paths, the third simulation gas turbine drives the electric turbine dynamometer through the first torque meter in the first path of power; and reaches the bridging gearbox through the second electromagnetic clutch, the first support and the sixth torque meter in the second path of power; then is connected with the second parallel operation gearbox through the seventh torque meter, the second support and the third electromagnetic clutch, and then drives the hydraulic dynamometer through the third torque meter.

3. A semi-physical simulation test bench for a multi-machine parallel operation device of gas turbines, comprising:

a test system, the test system comprising a first simulation gas turbine, a storage battery, an electric turbine dynamometer, a first SSS clutch, a second SSS clutch, a third SSS clutch, a hydraulic dynamometer and a generator, a first torque meter, a second torque meter, a third torque meter, a fourth torque meter, a fifth torque meter, a sixth torque meter, a seventh torque meter, a first electromagnetic clutch, a second electromagnetic clutch, a third electromagnetic clutch, a first support, a second support, a second simulation gas turbine, a third simulation gas turbine, couplers, a first parallel operation gearbox, a second parallel operation gearbox and a bridging gearbox;

wherein the first simulation gas turbine is connected with the first parallel operation gearbox through the first SSS clutch, the second torque meter and a second coupler; and the first parallel operation gearbox is connected with the electric turbine dynamometer through a first coupler and the first torque meter in sequence; the second simulation gas turbine is connected with the second parallel operation gearbox through the third SSS clutch, the fifth torque meter and an eighth coupler in sequence; and the second parallel operation gearbox is connected with the hydraulic dynamometer through a third coupler and the third torque meter in sequence; and the third simulation gas turbine is connected with the first parallel operation gearbox through the second SSS clutch, the fourth torque meter and a fifth coupler in sequence; power is separated into two paths, the first parallel operation gearbox drives the electric turbine dynamometer through the first coupler and the first torque meter in the first path of power; and reaches the bridging gearbox through a sixth coupler, the second electromagnetic clutch, the first support, the sixth torque meter and a tenth coupler in the second path of power; the bridging gearbox is connected with the second parallel operation gearbox through a ninth coupler, the seventh torque meter, the second support, the third electromagnetic clutch and a seventh coupler; and the second parallel operation gearbox drives the hydraulic dynamometer through the third coupler and the third torque meter; and a monitoring control system, the monitoring control system comprising a data processing simulation machine, an execution mechanism control system, an upper computer and a security and protection detector;

wherein the data processing simulation machine can perform real-time solution calculation from a controller model to a prime mover model, and performs data acquisition and data output; the execution mechanism control system comprises a first motor, a second motor, a third motor, a first motor frequency converter, a second motor frequency converter, a third motor frequency converter, a generator controller, an electric turbine dynamometer controller and a hydraulic dynamometer controller; the execution mechanism control system can transmit a rotating speed torque signal to the data processing simulation machine and the upper computer; and the upper computer can analyze and monitor data of the data processing simulation machine and the execution mechanism control system.

4. The semi-physical simulation test bench for a multi-machine parallel operation device of gas turbines according to claim 3, wherein the upper computer has an automatic mode and a manual mode, and can control the automatic mode and the manual mode to be switched.

5. The semi-physical simulation test bench for a multi-machine parallel operation device of gas turbines according to claim 3, wherein the first parallel operation gearbox and the second parallel operation gearbox are both multi-shaft gearboxes.

\* \* \* \* \*